United States Patent
Bonneau et al.

(10) Patent No.: US 7,441,827 B2
(45) Date of Patent: Oct. 28, 2008

(54) REAR SUPPORT FOR A VEHICLE, A REAR MODULE, AND A METHOD OF SECURING SUCH A MODULE

(75) Inventors: Eric Bonneau, Saint Romain de Jalionas (FR); Francis Cordebar, Villefranche sur Saone (FR)

(73) Assignee: Compagnie Plastic Omnium, Lyons (FR)

( * ) Notice: Subject to any disclaimer, the term of this patent is extended or adjusted under 35 U.S.C. 154(b) by 0 days.

(21) Appl. No.: 11/440,078

(22) Filed: May 25, 2006

(65) Prior Publication Data
US 2007/0024091 A1 Feb. 1, 2007

(30) Foreign Application Priority Data
May 25, 2005 (FR) .................................. 05 05238
Sep. 2, 2005 (FR) .................................. 05 09021

(51) Int. Cl.
*B62D 25/24* (2006.01)
*B60J 5/10* (2006.01)

(52) U.S. Cl. .............................. 296/146.8; 296/146.11; 296/191

(58) Field of Classification Search .............. 296/146.1, 296/146.8, 146.11, 191, 193.03, 193.04, 296/193.08, 202
See application file for complete search history.

(56) References Cited

U.S. PATENT DOCUMENTS

| | | | |
|---|---|---|---|
| 4,908,908 A | | 3/1990 | Mitsuoka et al. |
| 6,139,093 A | * | 10/2000 | Elliott et al. ............ 296/203.02 |
| 6,283,535 B1 | * | 9/2001 | Yuge ........................ 296/146.8 |
| 6,550,839 B2 | * | 4/2003 | Rogers et al. ................. 296/56 |
| 6,595,580 B2 | * | 7/2003 | Eberle et al. ............ 296/203.04 |
| 6,783,172 B2 | | 8/2004 | De Gaillard |
| 6,789,837 B2 | * | 9/2004 | Mitsui et al. .............. 296/146.8 |
| 6,814,392 B1 | * | 11/2004 | Tomaszewski ........... 296/146.4 |
| 6,824,196 B2 | * | 11/2004 | Neidlein ................. 296/146.11 |
| 6,901,704 B2 | * | 6/2005 | Sakaue et al. ................. 49/340 |
| 6,918,628 B2 | * | 7/2005 | Eipper et al. ........... 296/187.11 |
| 6,955,390 B2 | * | 10/2005 | Rigorth et al. ........... 296/146.4 |
| 6,974,180 B2 | * | 12/2005 | Eipper et al. ................ 296/210 |
| 7,021,698 B2 | * | 4/2006 | Yamada et al. ........... 296/146.8 |
| 7,032,960 B2 | * | 4/2006 | Roehl ..................... 296/203.04 |
| 2001/0008057 A1 | * | 7/2001 | Sakaue et al. ................. 49/341 |
| 2002/0005650 A1 | * | 1/2002 | Rogers et al. ................. 296/56 |

(Continued)

FOREIGN PATENT DOCUMENTS

DE    101 17 935 A1    10/2002

(Continued)

*Primary Examiner*—D. Glenn Dayoan
*Assistant Examiner*—Paul A Chenevert
(74) *Attorney, Agent, or Firm*—Oliff & Berridge, PLC

(57) ABSTRACT

The present invention relates to a rear support (12) for a vehicle (24) that is to be fitted to the rear end of the body (22) of the vehicle (24) in the vicinity of a door (14) movable to pivot about an axis that is substantially horizontal, pivoting being enabled by at least one hinge (16) having a stationary portion and a portion secured to the door, said portion being movable relative to the stationary portion, the support (12) being shaped to receive the stationary portion of at least one hinge (16) and to enable it to be secured to the body (22), and also to receive at least one item of functional equipment (32, 34, 36) of the vehicle (24).

18 Claims, 4 Drawing Sheets

U.S. PATENT DOCUMENTS

| | | |
|---|---|---|
| 2002/0195841 A1 | 12/2002 | Eberle et al. |
| 2003/0075948 A1 | 4/2003 | De Gaillard |
| 2003/0122399 A1 | 7/2003 | Seksaria et al. |
| 2004/0090083 A1 | 5/2004 | Greuel et al. |
| 2004/0124671 A1* | 7/2004 | Roehl .................... 296/203.04 |
| 2005/0046229 A1* | 3/2005 | Yamada et al. ........... 296/146.8 |
| 2007/0013207 A1* | 1/2007 | Guernalec ................ 296/146.8 |
| 2007/0096502 A1* | 5/2007 | Hakamata et al. ........ 296/146.8 |

FOREIGN PATENT DOCUMENTS

| | | |
|---|---|---|
| DE | 102 32 105 A1 | 1/2004 |
| DE | 103 10 931 A1 | 9/2004 |
| EP | 0 325 707 A2 | 8/1989 |
| EP | 1 154 113 A2 | 11/2001 |
| EP | 1 300 271 A1 | 4/2003 |
| FR | 2 819 477 | 7/2002 |
| JP | A 6-191439 | 7/1994 |
| WO | WO 02/057102 A1 | 7/2002 |
| WO | WO 2004/007883 A1 | 1/2004 |

* cited by examiner

REAR SUPPORT FOR A VEHICLE, A REAR MODULE, AND A METHOD OF SECURING SUCH A MODULE

BACKGROUND

A vehicle is known in the state of the art that has a rear door, in particular a tailgate, movable to pivot about an axis that is substantially horizontal and that is situated in the vicinity of the roof of the vehicle.

In order to enable it to be pivoted, the tailgate is generally secured to the motor vehicle body by means of two hinges. Two cylinders assist in opening the tailgate.

Furthermore, it is becoming more and more commonplace for the opening or closing of the tailgate to be driven by electrical actuators.

The tailgate of a vehicle is assembled onto the body of the vehicle on an assembly line. Unfortunately, because of the numerous above-mentioned elements that make up the tailgate and its means for fastening it to the vehicle body, the assembly operation takes time. In order to minimize assembly costs, it is preferable to reduce assembly time on the assembly line and also to reduce the number of operations that need to be performed.

The invention thus proposes a solution that enables a tailgate to be secured quickly to the body of a vehicle.

SUMMARY

The invention provides a rear support for a vehicle, the support being designed for fitting to the rear end of the body of the vehicle in the vicinity of a door movable to pivot about an axis that is substantially horizontal, pivoting being enabled by at least one hinge having a stationary portion and a portion secured to the door and movable relative to the stationary portion, the support being shaped to receive the stationary portion of at least one hinge and to enable it to be secured to the body and to receive at least one item of functional equipment of the vehicle.

By means of the invention, the tailgate and the elements enabling it to be secured to the vehicle body can be assembled on a single support away from the assembly line. The support and its various elements can be fitted on the vehicle on the assembly line in a single operation, thereby providing a considerable saving in time compared with the state of the art.

A support of the invention may also include one or more of the following features.

The support includes through orifices enabling the stationary portion of the hinge to be secured to the body, e.g. by means of bolts.

The support comprises a box and a bodywork panel closing the box such that once the rear support has been fitted to the rear end of the vehicle body, the bodywork panel extends the vehicle roof rearwards. This makes it possible to house the various elements in the box and to mount the box on the motor vehicle from outside the vehicle, the bodywork panel then masking the various elements fitted in the box.

The bodywork panel comprises a face that is visible from outside, and an opposite face, the opposite face including fastener means for securing the bodywork panel to the body, said fastener means being inaccessible from the visible face of the panel, while nevertheless being suitable for being activated from said visible face. It is thus possible to mount the panel on the box from outside the vehicle, without any need to penetrate into the vehicle cabin in order to secure it.

The fastener means for securing the bodywork panel to the body comprise snap-fastener means.

The support is shaped so as to receive the stationary portions of two hinges having a pivot axis, the support including prepositioning means for prepositioning the stationary portion of each hinge relative to the support. Generally, a door is secured by means of two spaced-apart hinges. It is important for the hinges to be properly positioned relative to each other so that the door can opened and closed without effort and so that the hinges are subjected to the least possible friction. The support constitutes a frame of reference having dimensions that are known precisely, unlike the body-in-white of the vehicle whose dimensions are not known precisely to the person skilled in the art. It is thus advantageous for hinge-prepositioning means to be provided on the support.

The support is shaped to receive the stationary portions of two hinges having a pivot axis, the stationary portion of each hinge comprising two distinct bearings, the support including prepositioning means for positioning at least one bearing of each hinge relative to the support. It is commonplace for the stationary portions of the hinges, in particular hinges of the "swan neck" type, to have two distinct bearings. It then suffices for one of the bearings in each hinge to be prepositioned, with the positioning of the other bearing in each hinge then being achieved by means of the moving portion of each hinge.

The prepositioning means are integrally formed with the support.

The prepositioning means are arranged so that the pivot axes of the two hinges coincide substantially. It is very important for the pivot axes of the two hinges to coincide in order to reduce internal friction in the hinges. Because of the prepositioning of the hinges, friction is reduced significantly, as is noise and fatigue in the material constituting the hinges. Reducing friction also makes it possible to design hinges of smaller dimensions. In addition, when the hinges are motor-driven, it is possible to provide motors of smaller power.

The prepositioning means comprise rectilinear ribs extending substantially parallel to the pivot axis of the door. The positioning of a hinge is obtained by putting the hinge into abutment against the rib.

The prepositioning means comprise studs arranged on the support, the studs being suitable for penetrating into openings formed in the stationary portion of each hinge.

OTHER ASPECTS OF THE INVENTION

The invention also provides a rear module for a motor vehicle, the module comprising:

a support as defined above;

a door movable to pivot about an axis that is substantially horizontal;

at least one hinge having a stationary portion and a moving portion movable relative to the stationary portion in such a manner as to enable the door to pivot, the moving portion being secured to the door;

fastener means for securing the stationary portion of the hinge to the body of the vehicle; and at least one item of functional equipment on the vehicle carried by the support.

Such a module can thus be assembled away from the assembly line and it can be fitted on the vehicle in a single operation.

A module of the invention may also include one or more of the following features.

The functional equipment is any of the items in the set constituted by: an antenna, an electronics card, a cylinder for assisting in opening the door, an actuator for assisting in opening and closing the door, a reversing camera, a washer jet, a washer liquid tank, a stop light, and a vehicle cabin light.

The bodywork panel is secured to the door.

The bodywork panel is a spoiler.

The module has first and second pivot type hinges, each hinge being such that its moving portion comprises a pin secured to the door, and its stationary portion comprises two distinct bearings, the pin and the bearings for each hinge sharing a common axis.

The first hinge comprises two sliding bearings, i.e. allowing the pin of the first hinge to slide axially, and the second hinge comprises one sliding bearing and one thrust bearing, i.e. a bearing suitable for withstanding an axial force generated by the pin of the second hinge.

The module is such that:
the support includes prepositioning means for prepositioning the three sliding bearings such that the axes of the sliding bearings coincide substantially; and
the thrust bearing is free to move in translation relative to the support along the Y direction defined by the axes of the sliding bearings.

Given that at least one of the bearings of each hinge is prepositioned relative to the module, it is ensured that the hinges have a common axis and that friction internal to the hinges is minimized. Because the thrust bearing is free to move relative to the support in translation in the direction defined by the axes of the sliding bearings, and because the other three bearings are sliding bearings, the door can move relative to the support along the axial direction of the bearings. Thus, while the module is being secured to the body-in-white of the vehicle, it is possible to adjust the position of the door in a horizontal direction extending transversely to the vehicle without any need to move the support.

The invention also provides a method of securing a rear module as defined above to the body of a motor vehicle, characterized in that the following steps are performed in succession:

presenting the module with the door in the closed position to face the body, the hinge being accessible from outside the vehicle;

adjusting the position of the door relative to at least one reference point;

securing the stationary portion of the hinge to the body of the vehicle; and masking the hinge by means of the bodywork panel so that the hinge is no longer visible from outside the vehicle.

By means of the invention, the door is secured to the body while it is in the closed position. Assembly clearance can thus be reduced very quickly, since there is no need to open and close the door several times over as happens in the state of the art. The position of the door can be adjusted while it is in the closed position.

It is particularly advantageous to use this method on motor vehicle assembly lines. Given that there is no need to leave empty space behind the vehicle for the purpose of allowing the door to open or close, it is possible to reduce the spacing between successive vehicles being produced on the assembly line. This makes it possible to achieve a significant saving in space.

Finally, this new method of manufacture is not used to the detriment of the appearance of the vehicle since the hinges are masked by a bodywork panel that makes them invisible from outside the vehicle.

Preferably, the reference point is selected from any one of the items in the set comprising: the vehicle body, a bumper, a bodywork part, a vehicle fender, a vehicle roof member, and a vehicle rear light.

DETAILED DESCRIPTION OF EMBODIMENTS

Figure 1:
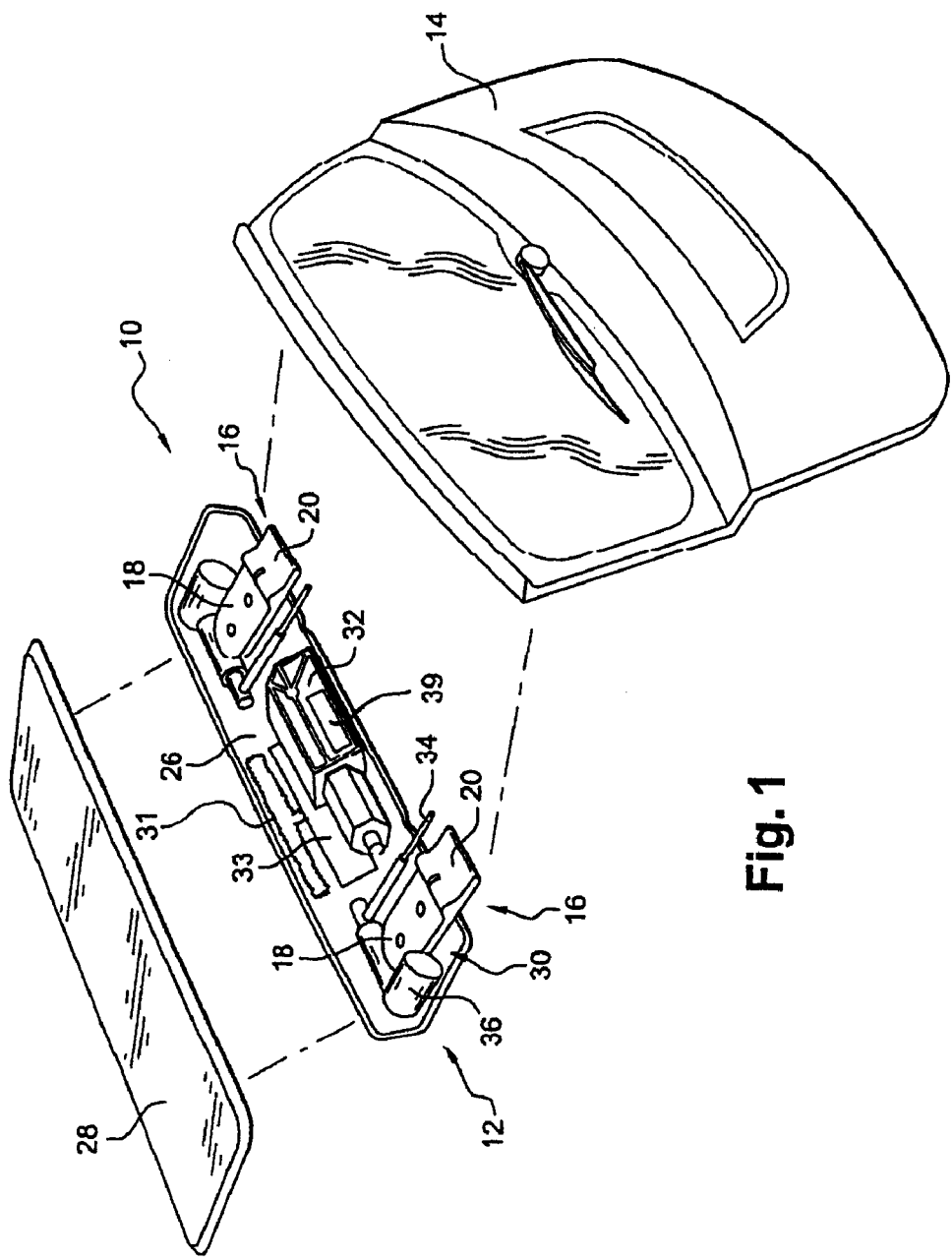
FIG. 1 is an exploded diagram of a rear module constituting a first embodiment of the invention.

FIG. 1 is an exploded view of a rear module 10 of the invention. The rear module 10 comprises a rear support 12, a door 14 suitable for pivoting about an axis that is substantially horizontal, two hinges 16, each comprising a stationary portion 18, a moving portion 20 that moves relative to the stationary portion 18 in such a manner as to enable the door 14 to pivot, the moving portions 20 of the hinges 16 being secured to the door 14, an antenna 31 and a stoplight 39.

In the example shown, the door 14 is a tailgate, but the invention is equally applicable to a trunk.

Figure 2:
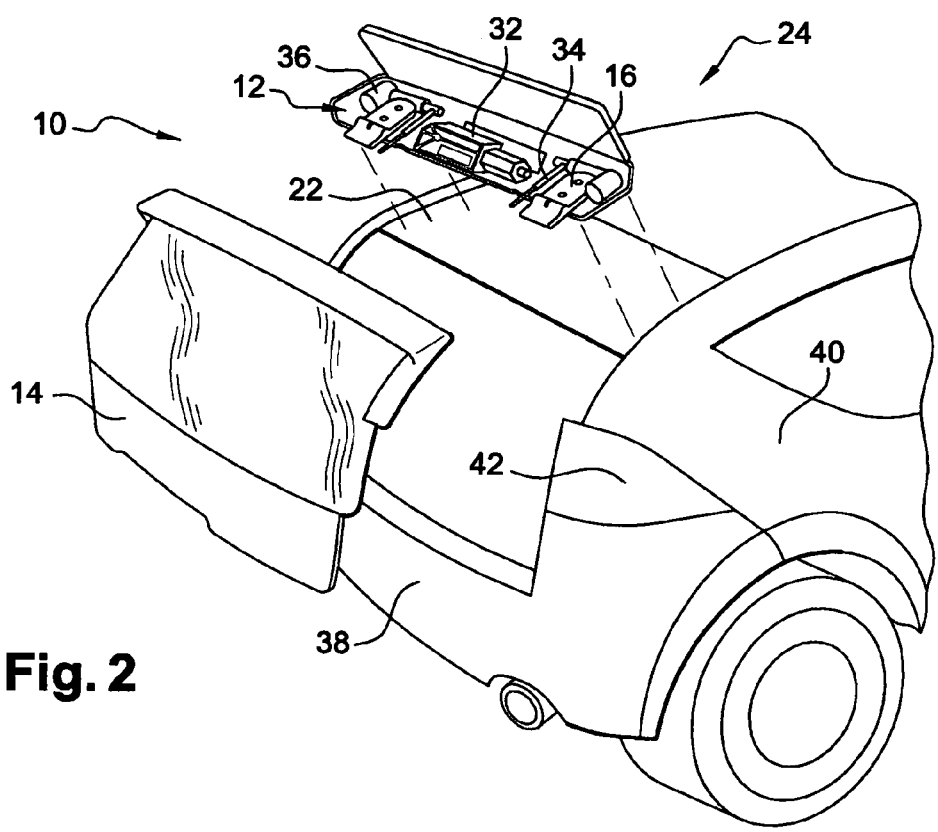
FIG. 2 is an exploded perspective diagram of the rear end of a motor vehicle with the module of FIG. 1.
Figure 3:
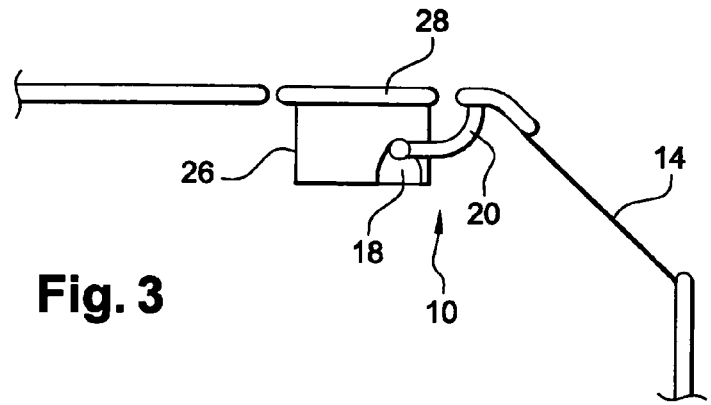
FIG. 3 is a diagrammatic vertical longitudinal section of the rear of the vehicle shown in FIG. 2.

As shown in FIGS. 2 and 3, the rear support 12 is for fitting to the rear end of the body 22 of a vehicle 24. Once the support has been fitted to the rear end of the body 22 of the vehicle, the stationary portions 18 of the hinges 16 are secured to the body 22 by conventional fastener means (not shown) enabling the positions of the stationary portions of the hinges to be adjusted relative to the body. This makes it possible to reduce assembly clearances between the door and the surrounding bodywork parts.

By way of example, the body and the stationary portions of the hinges have orifices facing one another with bolts passing therethrough. In order to allow adjustment of relative position between the body and the hinges, at least one of the orifices presents a diameter that is greater than the diameter of the shank of the corresponding bolt.

The support 12 comprises a box 26 made of thermoplastic material and a bodywork panel 28 made of thermoplastic material, closing the box 26, such that once the rear support 12 is fitted to the rear end of the body 22 of the vehicle 24, the bodywork panel 28 extends the roof of the vehicle 24 rearwards.

The door 14 is connected to the support 12 via the hinges 16. For this purpose, the box 26 of the support 12 is shaped to receive the stationary portions 18 of the two hinges 16 and to allow said stationary portions 18 to be secured to the body 22. For example, if the stationary portions of the hinges are connected to the body by bolts, said orifices are provided in the support 12 so as to allow the bolts to pass through it. The orifices are preferably oblong so that it is possible to adjust the position of the support relative to the body so as to limit assembly clearances. The box may be provided with additional fastener means engaging the body, distinct from the fastener means for fastening the hinges to the body.

The rear module 10 also includes functional equipment 30 carried by the box 26 of the support 12 which is shaped for this purpose to receive them. In the example shown, the functional equipment 30 comprises an actuator 32 for assisting in opening and closing the door 14, an electronics card 33 for an antenna 31, two cylinders 34 for providing assistance in opening the door 14, and two reversing cameras 36.

When an antenna 31 is housed in the box of the rear module, it is important for the bodywork panel 28 to be of thermoplastic material so as to avoid disturbing the propagation of electromagnetic waves.

The rear module 10 is preassembled away from the motor member assembly line. The rear module 10 is then mounted in a single step on the body 22 of the motor vehicle 24.

The method of fastening the rear module 10 to the body 22 of the vehicle 24 is as follows.

During a first step, the rear module 10 is presented with the door 14 in the closed position facing the body 22, the hinge 16 being accessible from outside the vehicle. For this purpose, the box 26 is uncovered by removing the bodywork panel 28.

Thereafter, the position of the door 14 is adjusted relative to a reference point. By way of example, the reference point is the vehicle body 22 for centering the door, a bumper 38 of the vehicle, a bodywork part, in particular a side of the body, a fender 40 of the vehicle, the roof of the vehicle, or a rear light 42 of the vehicle.

Thereafter, the stationary portions 18 of the hinges 16 are secured to the body 22 of the vehicle by the above-mentioned fastener means for fastening the stationary portions of the hinges to the vehicle body.

Finally, the hinges 16 are masked by means of the bodywork panel 28, so that they are no longer accessible or visible from outside the vehicle. The position of the bodywork panel is adjusted relative to the roof or to a surrounding bodywork part such as the side of the body.

In order to enable this masking step to be performed from outside the vehicle, without it being necessary to open the door 14 or to penetrate into the vehicle cabin in order to secure the panel 28, it is advantageous for the bodywork panel 28 to have a face that is visible from the outside and an opposite face, the opposite face including fastener means for fastening the panel 28 to the box, said fastener means being inaccessible from the visible face of the panel, while nevertheless being activatable from said visible face.

The fastener means must be inaccessible from the outside of the vehicle firstly for reasons of appearance, and secondly to avoid theft. These fastener means may be constituted by snap-fasteners 29 means, for example.

Thus, it is not necessary to open the door 14 in order to secure the rear module 10 to the body 22 of the vehicle. All assembly operations can be performed from outside the vehicle. Nevertheless, means are provided for deactivating the fastener means for securing the bodywork panel to the box, but from inside the vehicle. It can be advantageous to be able to access the box 26, and the various items of functional equipment 30 contained therein, e.g. in order to replace a faulty item of functional equipment, or to add another one.

Putting such a module into place on a motor vehicle requires certain adaptations to the structure of the motor vehicle. In particular, and as shown in FIGS. 2 and 3, it is necessary to shorten the rear of the vehicle roof by a length that is substantially equal to the width of the bodywork panel 28.

The invention is not limited to the main embodiment as described above.

Figure 4:
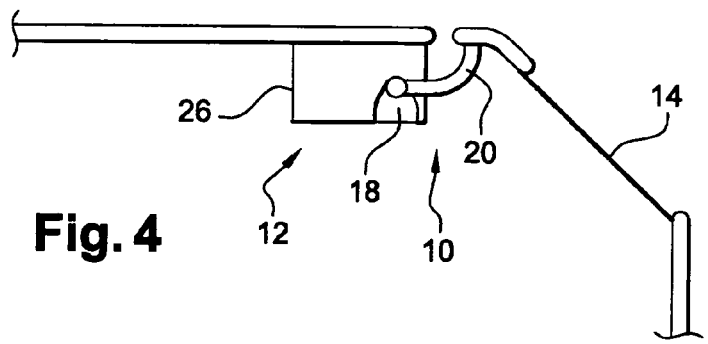
FIG. 4 is a diagrammatic vertical longitudinal section of a vehicle provided with a module constituting a second embodiment of the invention.

In a second embodiment of the invention, as shown in FIG. 4, the rear support 12 comprises a box 26 that does not have a bodywork panel for closing the box 26. In this embodiment, the operation of mounting the rear module 10 on the motor vehicle is performed with the door 14 open, or else with the door closed and the means for securing the stationary portions of the hinges to the vehicle body being accessed from inside the vehicle cabin. This embodiment presents the advantage of not requiring any adaptation to the roof of the vehicle.

Figure 5:
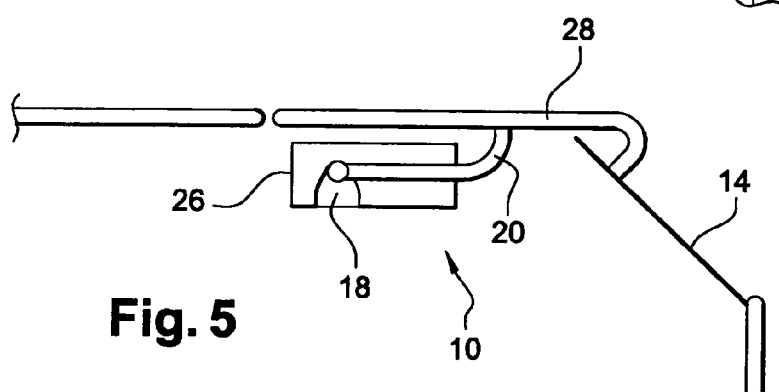
FIG. 5 is a diagrammatic vertical longitudinal section of a vehicle provided with a module constituting a third embodiment of the invention.

In a third embodiment of the invention, shown in FIG. 5, the bodywork panel 28 is a spoiler secured to the door 14. In this embodiment, it is necessary to provide means for removably fastening the spoiler 28 to the door 14 so as to be able to remove the spoiler for accessing the inside of the box 26.

Figure 6:
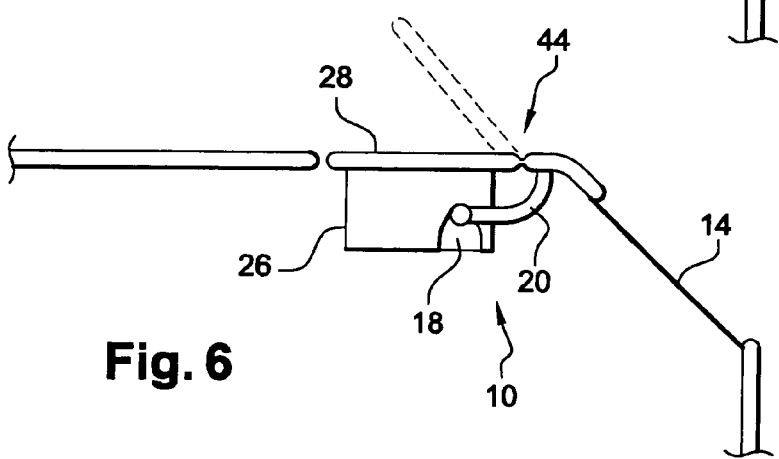
FIG. 6 is a diagrammatic vertical longitudinal section of a vehicle provided with a module constituting a fourth embodiment of the invention.

In a fourth embodiment of the invention as shown in FIG. 6, the bodywork panel 28 closing the box 26 is made of thermoplastic material and presents a line 44 of reduced thickness extending transversely relative to the travel direction of the motor vehicle. This line 44 of reduced thickness acts as a hinge and by folding makes it possible to gain access to the inside of the box 26, as shown in dashed lines in FIG. 6.

A fifth embodiment of the invention is shown in FIGS. 7 to 10. To describe these figures, an X, Y, Z frame of reference is defined as follows:

the direction X corresponds to the longitudinal horizontal direction of the vehicle, pointing forwards;

the direction z corresponds to the vertical direction, pointing upwards; and the direction Y is such that the X, Y, Z frame of reference is a right-handed orthonormal frame of reference, i.e. Y extends transversely relative to the vehicle.

Figure 7:
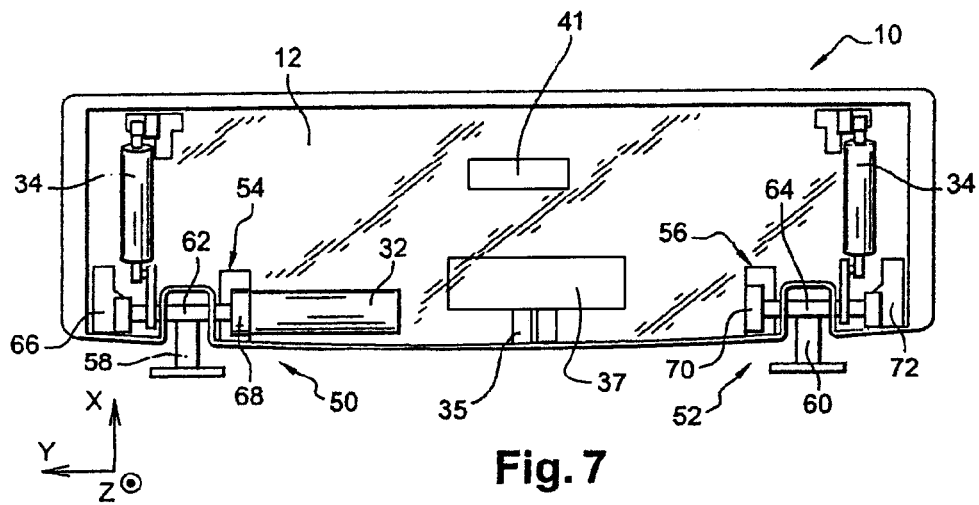
FIG. 7 is a diagram seen from above of a module constituting a fifth embodiment of the invention.

The rear module 10 shown in FIG. 7 comprises an elongate support 12 extending along the direction Y. The rear module 10 has first and second pivot type hinges 50 and 52 with axes extending along the Y direction. Each of the hinges 50 and 52 comprises a respective stationary portion 54, 56, and a moving portion 58, 60 including a pin 62, 64 secured to the door. As shown in FIG. 7, cylinders 34 for assisting in opening the door are connected to the two pins 62 and 64, and an actuator 32 for assisting in opening and closing the door is connected to the pin 62. The rear module shown in FIG. 7 also includes vehicle cabin light 41, washer jet 35, and liquid tank 37.

Each stationary portion 54, 56 has two respective bearings 66 & 68 and 70 & 72. The two bearings 66 & 68 of the stationary portion 54 of the first hinge 50 and the bearing 72 of the stationary portion 56 of the second hinge 52 are sliding bearings, i.e. they allow the two pins 62 and 64 to slide axially. The first hinge 50 is shown in greater detail in FIG. 9.

The bearing 70 on the stationary portion 56 of the second hinge 52 is a thrust bearing, i.e. a bearing suitable for withstanding an axial force generated along the pin 64 of the second hinge. This bearing 70 is shown more clearly in FIG. 10. Axial forces are taken up by means of a spring clip 74 positioned on the pin 64, on either side of the bearing 70.

The support 12 has means for prepositioning the bearings 66, 68, 70, 72, arranged on the support so that the axes of the bearings coincide substantially and extend along the Y direction. Given that the dimensions of the support are known with precision, the prepositioning means enable the bearings to be positioned properly relative to one another.

Figure 8:
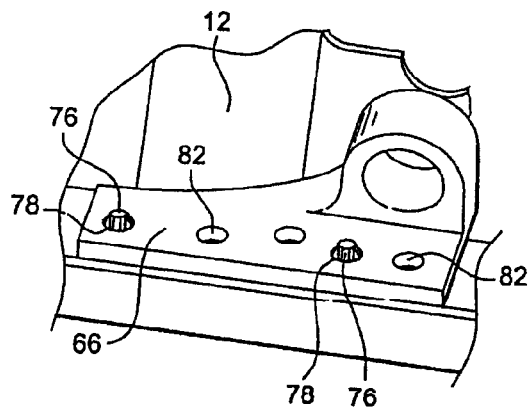
FIGS. 8 to 10 are detailed diagrams of the fasteners of the module shown in FIG. 7.
Figure 9:
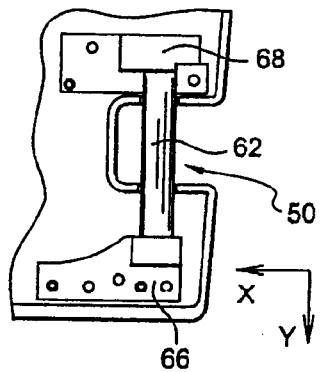

The means for prepositioning the sliding bearings 66, 68, and 72 are visible in FIG. 8 which shows the bearings 66. The prepositioning means comprise studs 76 formed on the support 12, the studs 76 being suitable for penetrating in openings 78 formed in each bearing. This ensures that the three sliding bearings are secured to the support.

Figure 10:
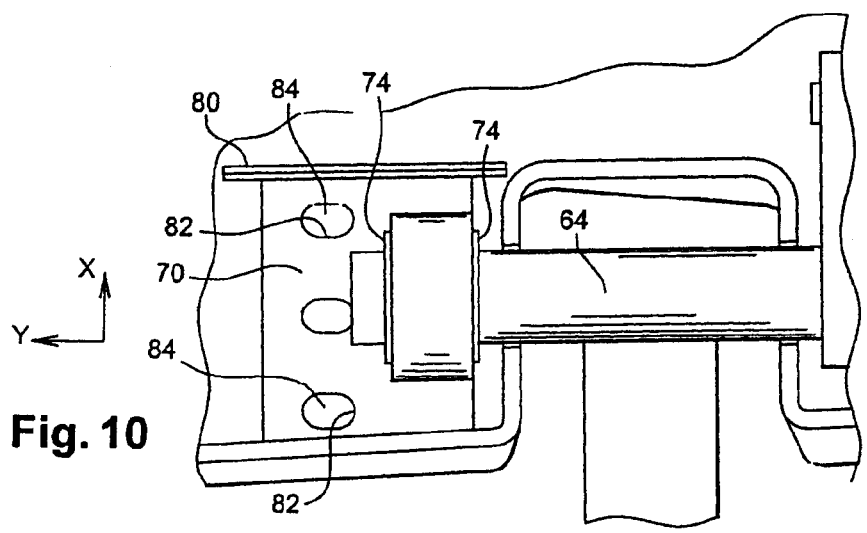

The prepositioning means for the thrust bearing 70 are visible in FIG. 10. These prepositioning means comprise a rectilinear rib 80 extending substantially parallel to the axis of the bearings, i.e. in the Y direction. The thrust bearing 70 is in contact with the rib 80 and thus enables the bearings 70 to be accurately positioned in the X direction. The thrust bearing 70 does not have prepositioning studs, so it is free to move in translation relative to the support 12 along the Y direction.

In addition to the openings 78 for prepositioning purposes, all four bearings 66, 68, 70, 72 have openings 82 forming means for fastening to the vehicle body 22. For this purpose, the support has through orifices 84 (visible in FIG. 10) facing the openings 82. It is thus possible to secure the bearings to the body by means of bolts (not shown), the shanks of the bolts then passing through the openings 82 and the orifices 84. Given that the thrust bearing 70 is free to move in translation, relative to the support 12 and in the Y direction, it is preferable for the orifices 84 placing the openings 82 in the thrust bearing 70 to be oblong in shape along the Y direction.

The method of securing the rear module 10 to the body 22 of the vehicle 24 is then as follows.

During a first step, the rear module 10 is presented with the door 14 in the closed position so as to face the body 22, the hinges 50 and 52 being accessible from outside the vehicle.

Thereafter, the position of the door 14 is adjusted relative to a reference point. By way of example, this reference point is the body 22 of the vehicle for centering the door, a bumper 38 of the vehicle, a bodywork part, in particular a side of the body, a fender 40 of the vehicle, the vehicle roof, or a rear light 42 of the vehicle.

By using the four above-described bearings 66, 68, 70, and 72, it is possible to move the door in translation along the Y direction relative to the support. The three sliding bearings 66, 68, and 72 allow the pins 62 and 64 to move in translation in the Y direction and the thrust bearing 70 is free to move in translation relative to the support 22 along the Y direction.

Thus, the position of the door 14 is adjusted in the Y direction by moving the door relative to the support 12.

Once the door is properly positioned along the Y direction, the bearings are secured to the body 22 of the vehicle by the above-mentioned fastener means for fastening the bearings to the vehicle body.

The thrust bearing 70 then prevents further movement of the door along the direction Y relative to the body since the bearing 70 is secured to the body.

The invention claimed is:

1. A rear support for a vehicle, the rear support being structured to fit a rear end of a body of the vehicle in vicinity of a door of the vehicle movable to pivot about an axis (Y) that is substantially horizontal, pivoting being enabled by at least one hinge having a stationary portion and a portion secured to the door and movable relative to the stationary portion, the rear support comprising:
    a box to receive the stationary portion of the at least one hinge to secure the stationary portion to the body and to receive at least one item of functional equipment of the vehicle; and
    a bodywork panel that closes the box, the bodywork panel having a visible face that is visible from outside, wherein when the box is fitted to the rear end of the vehicle body, the bodywork panel extends a roof of the vehicle rearwards,
    wherein the bodywork panel is removably secured to the box.

2. The rear support according to claim 1, further comprising through orifices enabling the stationary portion of the at least one hinge to be secured to the body by bolts.

3. The rear support according to claim 1, wherein the bodywork panel includes an opposite face, the opposite face including fastener means for securing the bodywork panel to the body, the fastener means being inaccessible from the visible face of the panel and being activated from the visible face.

4. The rear support according to claim 1, wherein the shape receives stationary portions of two hinges having a pivot axis, the stationary portion of each of the two hinges including two distinct bearings, the rear support including prepositioning means for positioning at least one bearing of each of the two hinges relative to the rear support.

5. The rear support according to claim 1, wherein the rear support has a shape to receive the stationary portions of two hinges having a pivot axis, the rear support including prepositioning means for prepositioning the stationary portion of each of the two hinges relative to the rear support.

6. The rear support according to claim 5, wherein the prepositioning means are integrally formed with the rear support.

7. The rear support according to claim 5, wherein the prepositioning means are arranged so that the pivot axes of the two hinges coincide substantially.

8. The rear support according to claim 7, wherein the prepositioning means comprise rectilinear ribs extending substantially parallel to the pivot axis of the door.

9. A rear module for a motor vehicle, the module, comprising:
    a rear support;
    a door movable to pivot about an axis that is substantially horizontal;
    at least one hinge,
    the at least one hinge having a stationary portion and a moving portion movable relative to the stationary portion in such a manner as to enable the door to pivot, the moving portion being secured to the door;
    fastener means for securing the stationary portion of the hinge to the body of the vehicle; and
    at least one item of functional equipment on the vehicle carried by the rear support;
    wherein the rear support includes:
        a box; and
        a bodywork panel which closes the box, the bodywork panel having a visible face that is visible from outside,
    wherein the rear support fits to a rear end of the vehicle body of a vehicle in vicinity of the door movable to pivot about an axis (Y) that is substantially horizontal, pivoting being enabled by the at least one hinge,
    wherein the rear support has a shape to receive the stationary portion of the at least one hinge in order to enable the stationary portion to be secured to the body and to receive the at least one item of functional equipment of the vehicle,
    wherein when the rear support is fitted to the rear end of the vehicle body, the bodywork panel extends the roof of the vehicle rearward, and wherein the bodywork panel is removably secured to the box.

10. The rear module according to claim 9, wherein the functional equipment includes at least one of an antenna, an electronics card, a cylinder for assisting in opening the door, an actuator for assisting in opening and closing the door, a reversing camera, a washer jet, a washer liquid tank, a stop light, and a vehicle cabin light.

11. The rear module according to claim 9, the rear module further comprising:
first and second pivot type hinges,
wherein each of the first and second pivot type hinges include a moving portion, and
wherein each moving portion includes a pin secured to the door and each stationary portion includes two distinct bearings, the pin and the bearings for each hinge sharing a common axis.

12. The rear module according to claim 11, wherein the first hinge includes two sliding bearings such that the pin of the first hinge can slide axially, and the second hinge includes one sliding bearing and one thrust bearing, the one sliding bearing and the one thrust bearing being suitable for withstanding an axial force generated by the pin of the second hinge.

13. The rear module according to claim 12, wherein the rear support receives the stationary portions of two hinges having a pivot axis, the support including prepositioning means for positioning at least one bearing of each hinge relative to the support, in which:
the support includes prepositioning means for prepositioning the three sliding bearings such that the axes of the sliding bearings coincide substantially; and
the thrust bearing is free to move in translation relative to the support along the Y direction defined by the axes of the sliding bearings.

14. A method of securing a rear module to a body of vehicle, the rear module including a rear support, a door movable to pivot about an axis that is substantially horizontal, at least one hinge, the at least one hinge having a stationary portion and a moving portion movable relative to the stationary portion in such a manner as to enable a door to pivot, the moving portion being secured to the door; the method comprising the following steps in succession:
presenting the rear module with the door in the closed position to face the body, the at least one hinge being accessible from outside the vehicle;
adjusting the position of the door relative to at least one reference point;
securing the stationary portion of the at least one hinge to the body of the vehicle; and
masking the at least one hinge by a bodywork panel so that the at least one hinge is no longer visible from outside the vehicle,
wherein the bodywork panel is removably secured to a box.

15. The method according to claim 14, wherein the reference point is at least one of the vehicle body, a bumper, a bodywork part, a vehicle fender, a vehicle roof member, and a vehicle rear light.

16. A rear support for a vehicle, the rear support being structured to fit a rear end of a body of the vehicle in vicinity of a door of the vehicle movable to pivot about an axis (Y) that is substantially horizontal, pivoting being enabled by at least one hinge having a stationary portion and a portion secured to the door and movable relative to the stationary portion, the rear support comprising:

a box to receive the stationary portion of the at least one hinge to secure the stationary portion to the body and to receive at least one item of functional equipment of the vehicle; and
a bodywork panel that closes the box;
wherein when the box is fitted to the rear end of the vehicle body, the bodywork panel extends a roof of the vehicle rearwards,
wherein the rear support has a shape to receive stationary portions of two hinges having a pivot axis, the rear support including prepositioning means for prepositioning the stationary portion of each of the two hinges relative to the rear support, and
wherein the prepositioning means include studs that are arranged on the support, the support studs being suitable for penetrating into openings formed in the stationary portion of each of the two hinges.

17. A rear module for a motor vehicle apparatus, the module comprising:
a rear support;
a door movable to pivot about an axis that is substantially horizontal;
at least one hinge, the at least one hinge having a stationary portion and a moving portion movable relative to the stationary portion in such a manner as to enable the door to pivot, the moving portion being secured to the door;
fastener means for securing the stationary portion of the hinge to the body of the vehicle; and
at least one item of functional equipment on the vehicle carried by the rear support;
wherein the rear support includes:
a box; and
a bodywork panel which closes the box,
wherein the rear support fits to a rear end of the vehicle body of a vehicle in vicinity of the door movable to pivot about an axis (Y) that is substantially horizontal, pivoting being enabled by the at least one hinge,
wherein the rear support has a shape to receive the stationary portion of the at least one hinge in order to enable the stationary portion to be secured to the body and to receive the at least one item of functional equipment of the vehicle,
wherein when the rear support is fitted to the rear end of the vehicle body, the bodywork panel extends the roof of the vehicle rearward, and
wherein the bodywork panel is secured to the door.

18. A rear module for a motor vehicle, the rear module comprising:
a rear support;
a door movable to pivot about an axis that is substantially horizontal;
at least one hinge,
the at least one hinge having a stationary portion and a moving portion movable relative to the stationary portion in such a manner as to enable the door to pivot, the moving portion being secured to the door;
fastener means for securing the stationary portion of the hinge to the body of the vehicle; and
at least one item of functional equipment on the vehicle carried by the rear support;
wherein the rear support includes:
a box; and
a bodywork panel which closes the box, wherein the rear support fits to a rear end of the vehicle body of a vehicle in vicinity of the door movable to pivot about an axis (Y) that is substantially horizontal, pivoting being enabled by the at least one hinge, wherein the rear support has a shape to receive the stationary portion of the at least one hinge in order to enable the stationary portion to be secured to the body and to receive the at least one item of functional equipment of the vehicle, wherein when the rear support is fitted to the rear end of the vehicle body, the bodywork panel extends the roof of the vehicle rearward, wherein the bodywork panel is a removable bodywork panel, and wherein the bodywork panel is a spoiler.

* * * * *